(12) United States Patent
Utter et al.

(10) Patent No.: US 7,030,745 B2
(45) Date of Patent: Apr. 18, 2006

(54) SPARE TIRE USAGE DETECTION

(75) Inventors: Thomas E. Utter, Royal Oak, MI (US); Mark A Walters, Macomb, MI (US); Ryan M. Frakes, Bloomfield Hills, MI (US); Thomas H Tu, Troy, MI (US); M. Scott Buck, Commerce Township, MI (US); David A. Osinski, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 130 days.

(21) Appl. No.: 10/850,752

(22) Filed: May 21, 2004

(65) Prior Publication Data

US 2005/0258952 A1  Nov. 24, 2005

(51) Int. Cl.
*B60C 23/00* (2006.01)

(52) U.S. Cl. ...................... 340/447; 340/442

(58) Field of Classification Search ............... 340/447, 340/442, 444, 445; 73/146.2, 146.5; 701/32
See application file for complete search history.

(56) References Cited

U.S. PATENT DOCUMENTS

| | | | | |
|---|---|---|---|---|
| 5,109,213 A | * | 4/1992 | Williams | .................... 340/447 |
| 6,441,728 B1 | * | 8/2002 | Dixit et al. | .................. 340/447 |
| 6,486,773 B1 | * | 11/2002 | Bailie et al. | ................. 340/445 |
| 6,518,876 B1 | * | 2/2003 | Marguet et al. | ............. 340/447 |
| 6,580,365 B1 | * | 6/2003 | Starkey | ....................... 340/447 |
| 6,954,687 B1 | * | 10/2005 | Taguchi et al. | ............... 701/29 |
| 6,960,994 B1 | * | 11/2005 | Tabata et al. | ............... 340/442 |

* cited by examiner

*Primary Examiner*—John Tweel, Jr.
(74) *Attorney, Agent, or Firm*—Laura C. Hargitt

(57) ABSTRACT

Methods and apparatus are provided for detecting when a spare wheel (SP) is used to replace a previously rolling wheel on a vehicle, where each wheel can transmit wheel ID and motion status signals. The apparatus comprises a receiver, a memory for storing information relating wheel ID and location, a processor coupled to the receiver and memory for analyzing the wheel signals to determine if the SP is rolling, and a timer coupled to the processor that measures how long the SP has been rolling. When the SP has been rolling for predetermined time T, the processor looks at the motion status signals from remaining wheels to determine which is stopped, and then modifies the information stored in the memory to associate the SP ID with the wheel location formerly occupied by the now stopped wheel and associate the stopped-wheel ID with the storage location for the spare.

16 Claims, 3 Drawing Sheets

−PRIOR ART−

SPARE TIRE USAGE DETECTION

TECHNICAL FIELD

The present invention generally relates to systems and methods for monitoring wheel and tire usage on vehicles, and more particularly, automatically determining whether a vehicle spare tire has been put into active use on the vehicle.

BACKGROUND

It is known to provide RF sending units on vehicle wheels that provide information to a central radio receiver and processor on the vehicle about the status of the wheel, e.g., the wheel identity number (ID), the wheel location, whether it is rolling or stationary, wheel temperature, tire pressure, and so forth. Such systems are described for example in U.S. Pat. No. 5,109,213 to Williams; U.S. Pat. No. 6,441,728 B1 to Dixit et al, U.S. Pat. No. 6,486,773 B1 to Baille et al, U.S. Pat. No. 6,518,876 B1 to Marguet et al and U.S. Pat. No. 6,580,365 B2 to Starkey.

FIG. 1 is a simplified schematic diagram of prior art system 9 comprising five vehicles wheels 10A–10E interacting with on-board data receiver 14. Each vehicle wheel 10A–10E, has transmitter or sender 11A–11E coupled to instrumentation package 13A–13E and to antenna 12A–12E. Instrumentation package 13A–13E provides wheel ID, location and status information that is sent via RF signal 18A–18E from sender 11A–11E via antenna 12A–12E to on-board receiver 14 via antenna 15. Depending upon the particular approach used for correlating wheel ID and wheel location, signals 18A–18E may be bi-directional and/or encompass location transmitters or transceivers in the wheel wells, but this is not important to the present invention. Such systems are well known in the art and described, for example, in the above-referenced patents.

In many cases, these systems have two modes of operation: (1) a learning mode in which the wheel mounted unit interacts with a vehicle mounted location unit so that information on the tire ID and location on the vehicle can be related and learned by the vehicle electronics system so that it knows which wheel is where on the vehicle, and (2) an operating mode where the individual wheel sending unit transmits or sends its ID, location and status (e.g., rolling, temperature, pressure, etc.). In many arrangements the learning mode is only infrequently invoked, for example, when the wheels are mounted on the vehicle at the factory or when the wheels are rotated at a service location and the service technician accesses the vehicle diagnostic system to re-invoke the learning mode. In this situation, wheel location information stored in the on-board vehicle system memory remains unchanged until the learning mode is invoked again. A weakness of this arrangement is that when an unexpected tire change is made (e.g., when a flat occurs) the information stored in the central electronics unit is no longer current.

Accordingly, it is desirable to provide a system for detecting that a wheel change has taken place and updating the wheel ID and location information in the on-board vehicle electronics system memory without having to re-invoke the learning mode. In addition, it is desirable to be able to accomplish this without additional hardware and/or modification of the wheel mounted or vehicle mounted sensors, detectors, transmitters, receivers, ID units, and so forth. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for detecting when a spare wheel (SP) is used to replace, e.g., after a flat, a normally rolling wheel on a vehicle, where each wheel can transmit wheel ID and motion status signals. The apparatus comprises a receiver for receiving the wheel signals, a memory for storing information relating wheel ID and wheel location on the vehicle, a processor coupled to the receiver and memory for analyzing the wheel signals to determine if the SP is rolling, and a timer coupled to the processor that measures how long the SP has been rolling. When the SP has been rolling for predetermined time T, the processor looks at the motion status signals from remaining wheels to determine which is stopped, and then modifies the information stored in the memory to associate the SP ID with a wheel location formerly occupied by the now stopped wheel and associate the stopped-wheel ID with a storage location for the spare.

A method is provided for detecting when a spare wheel (SP) has replaced a normally rolling wheel on a vehicle, comprising, determining whether the SP is rolling and if so, starting a SP rolling timer. When the SP has been rolling for predetermined time T, then examining the motion status signal from remaining wheels to determine which wheel is now stopped, its ID and former location. Then associating a wheel ID for the SP with the former location of the stopped wheel and the stopped wheel ID with the stowage location of the SP.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

As used herein, the word "wheel" whether singular or plural is intended to be inclusive of the tire mounted thereon. For example, reference to data from a particular wheel is understood to include the desired information about the tire mounted thereon. Further the words "receiver" and "transmitter" or "sender" are not intended to be limited merely to signal incoming and outgoing functions, respectively, but are intended to include the meaning of "transceiver" that is, be capable of two-way wireless communication as the need arises. For convenience of explanation, it is assumed for purposes of the present invention that the learning mode has been completed and that each wheel is capable of transmitting its individual ID and its relevant function codes that define the wheel location on the vehicle and the wheel status, e.g., tire pressure, temperature, and so forth. The exact nature of the status information being transmitted by each wheel is not important to the present invention.

Figure 2:
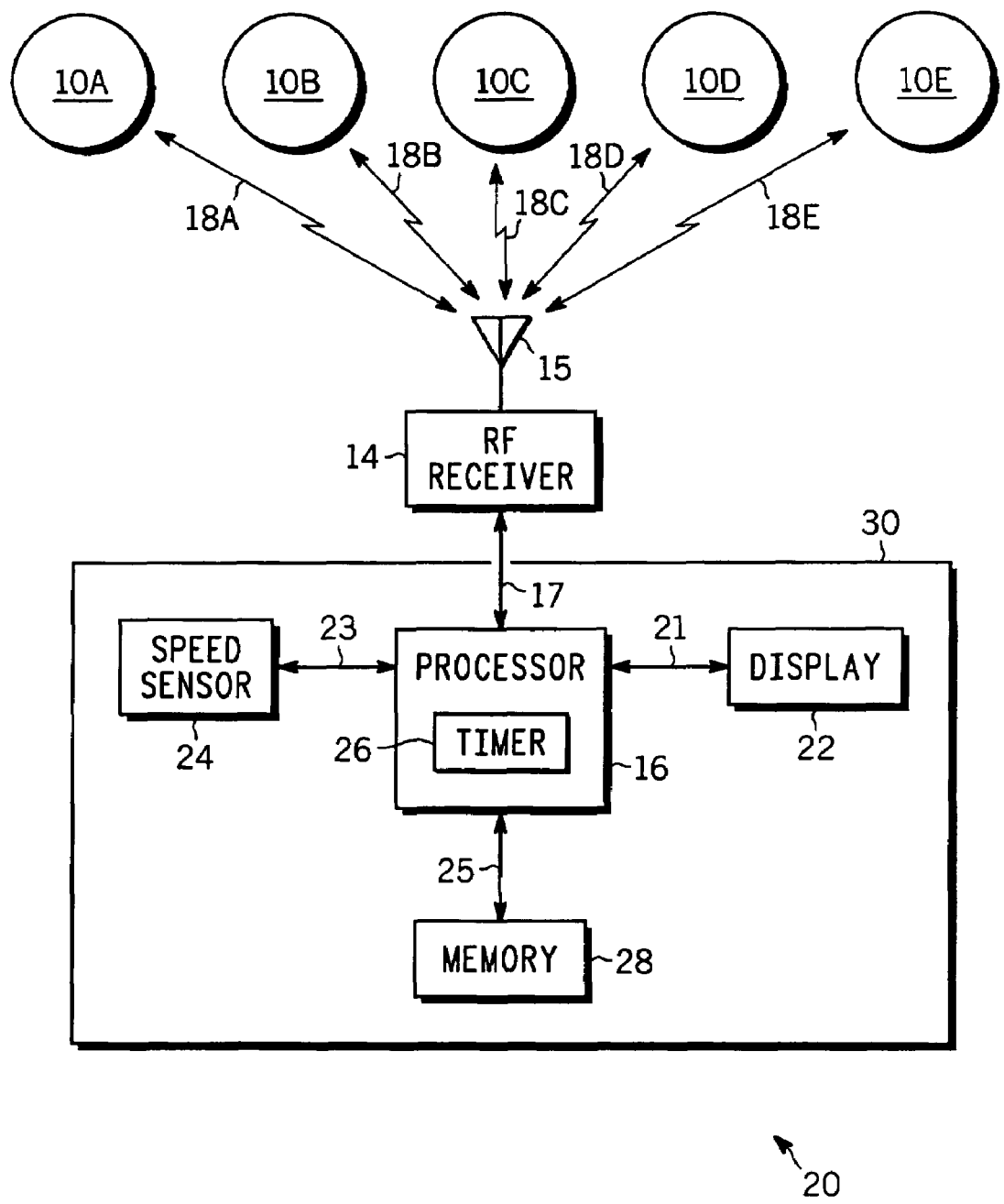
FIG. 2 is a simplified schematic diagram of five vehicle wheels interacting with an on-board vehicle electronic system for monitoring wheel ID, location and status, according to the present invention.

FIG. 2 is a simplified schematic diagram of five vehicle wheels 10A–10E interacting with on-board vehicle electronics system 20 comprising wheel data receiver 14 and data-processing sub-system 30, for monitoring wheel ID, location and status, according to the present invention. RF signals 18A–18E are transmitted by senders 11A–11E of individual wheels 10A–10E and received by on-board antenna 15 and receiver 14. The learning mode is presumed to be complete so that signals 18A–18E contain for each wheel, at least the wheel ID, location and status information. For convenience of explanation, reference number 10 is intended to refer to any and all of wheels 10A–10E, reference number 11 is intended to refer to any and all of senders or transmitters 11A–11E and reference number 18 is intended to refer to any and all of signals 18A–18E. Further, for convenience of explanation and not intended to be limiting, signals 18 are referred to as comprising ID and "function code" information where the functions codes carry the status information (e.g., temperature, pressure, rotating or stationary, etc.).

Receiver 14 demodulates signals 18 and sends the ID and function code information for each sending wheel to processor 16 via leads or bus 17. Sub-system 30 further comprises speed sensor 24, display 22 and memory 28, coupled to processor 16 via leads or buses 23, 21, 25, respectively. Processor 16 desirably but not essentially includes timer or timing function 26. Timing function 26 may be a software timer or a hardware timer as a part of processor 16 or separate from processor 16. Either arrangement is useful.

The learning process is presumed to have been already accomplished according to arrangements described in the prior art (e.g., using individual wheel well transmitters sending location info to the wheel electronics) and each particular wheel ID has been associated with a wheel location, e.g., left front (LF), right front (RF), left rear (LR), right rear (RR) and spare (SP), and that information stored in memory 28. Thus, during routine operation when signal 18 arrives with ID and status function codes, processor 16 is able to correlate the wheel ID with the wheel locations by retrieving the locations from memory for each wheel ID. Speed sensor 23 is conveniently included to provide processor 16 with information on the vehicle motion but this is not essential, since in most cases, the function codes received from the individual wheels will include an indication as to whether that wheel is moving or stationary.

Figure 3:
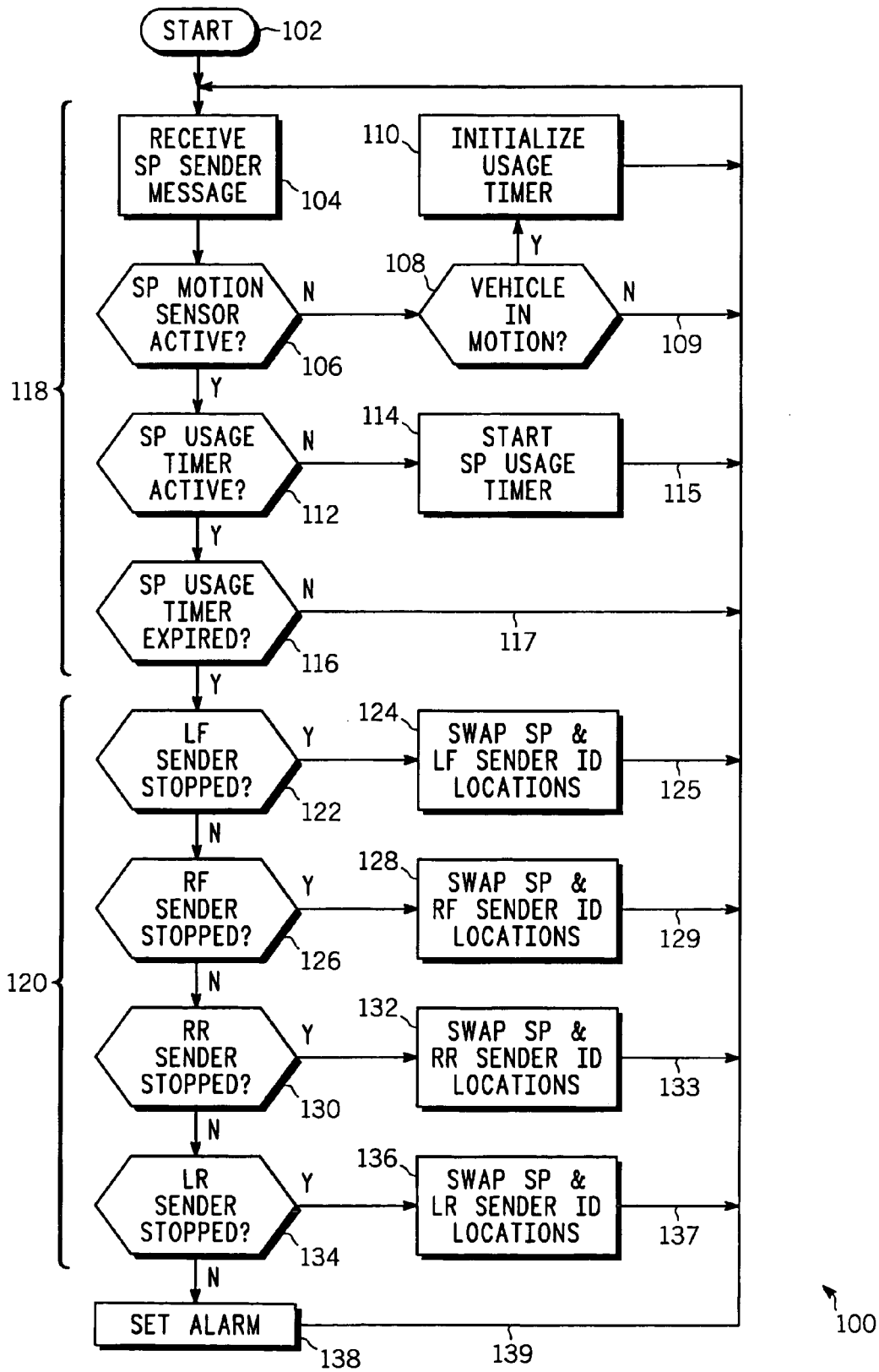
FIG. 3 is a simplified flow chart illustrating the method of the present invention.

When a flat has occurred and the spare (SP) used to replace the flat tire, unless the learning mode is repeated, the location information stored in memory 28 is no longer correct and should be updated. The process flow in FIG. 3 illustrates how system 20 of the present invention updates the location-ID correlation information stored in memory 28 without having to repeat the learn mode process. This is a significant advantage, especially with those automotive electronics systems where manual intervention is needed to initiate a learn mode sequence to correlate wheel IDs with altered wheel locations.

FIG. 3 is a simplified flow chart illustrating method 100 of the present invention for determining whether the spare tire (SP) has been mounted on a rotating wheel (RW) position and vice-versa. For convenience of explanation and not intended to be limiting it is assumed that the data transmitted by each wheel and recovered in receiver 14 are assigned to particular fields (e.g., time slots) in the transmitted message, for example, that there is a data field for wheel ID, another data field for tire pressure data, a further data field for motion data, and so forth. This is intended to be merely exemplary and any method of encoding and distinguishing the wheel information and function codes may be used.

Method 100 begins with START 102 that conveniently occurs on power up or at least when the vehicle begins to move as determined by speed sensor 24 or by examining the function codes on any message received from sender 11. In RECEIVE SP SENDER MESSAGE step 104, receiver 14 receives message 18 from sender 11 of the spare (SP) wheel, e.g., wheel 10E. Method 100 then executes SP MOTION SENSOR ACTIVE? query 106 wherein it is determined whether or not the function codes contained in signal 18 from the spare, e.g., signal 18E, show that the spare is rolling or stationary. This may be determined by processor 16 by, for example, comparing the function code received from wheel 10E in the appropriate 'motion' field in detected signal 18E with the function codes for 'moving' and/or 'stationary' stored in memory 28. If the outcome of query 106 is NO (FALSE), that is, the spare is not moving, then VEHICLE IN MOTION? query 108 is executed wherein it is determined whether or not the vehicle is moving. Query 108 may be performed, for example, by processor 16 interrogating speed sensor 24 or by any other available means, as for example but not limited to, examining the 'motion' field codes of signals 18 received from other wheels 10. If the outcome of query 108 is NO (FALSE), meaning that the vehicle is not moving, then as shown by path 109 method 100 returns to start 102 and initial query 104. If the outcome of query 108 is YES (TRUE), then method 100 executes INITIALIZE USAGE TIMER step 110, wherein timer 26 is set to an initial value, e.g., zero for a count-up timer and T for a count-down timer or whatever pother value is appropriate depending upon the type of timer used. Timer 26 is conveniently used to measure the amount of time that signal 18E from the spare tire shows that the spare tire is 'moving'. Persons of skill in the art will understand that INITIALIZE USAGE TIMER step 110 refers to setting timer 26 with the initial start value. Any type of counter or other timing arrangement may be employed. Thus, as used herein, the words "INITIALIZE USAGE TIMER" are intended to include any means of initializing a counter or timer of any type. Thereafter, method 100 returns again to start 102 and initial query 104.

Returning now to SP MOTION SENSOR ACTIVE? query 106, if the outcome of query 106 is YES (TRUE) indicating that the spare (SP) wheel is moving, e.g., rotating, then SP USAGE TIMER ACTIVE? query 112 is executed wherein it is determined whether timer 26 or equivalent measuring how long the spare tire has been rotating, is active or not, i.e., still measuring motion time for the spare tire. If the outcome of query 112 is NO (FALSE) then method 100 proceeds to START USAGE TIMER step 114 wherein timer 26 or equivalent is started to measure the time during which the spare tire is in motion. Thereafter method 100 returns to start 102 and initial query 104 as shown by path 115. Returning now to query 112, if the outcome of query 112 is YES (TRUE) indicating that timer 26 is active (e.g., from a prior loop through step 114), then method 100 proceeds to SP USAGE TIMER EXPIRED? query 116. If the outcome of query 116 is NO (FALSE) then method 100 returns to start 102 and initial query 104 as shown by path 117. During first portion 118 of method 100, processor 16 has determined that the spare wheel, e.g., wheel 10E is in motion and has been in motion for predetermined time duration T measured by timer 26. Steps 104, 106, 112, 116 of portion 118 repeat until either unit 11E on spare wheel 10E stops sending signal 18E indicating that spare wheel 10E continues in motion or until time T has expired. Time duration T is chosen to be greater than those accidental movements of spare tire 10E as might from time to time occur in the life of the vehicle aside from mounting the spare on a rolling wheel location. About 5 to 60 minutes is suitable for time interval T with about 15 minutes being preferred. System 20 has now logically determined that the spare wheel, e.g., wheel 10E, is no longer on the customary spare tire location, since where it still there it would not be in motion for time T.

Knowing that the spare tire is no longer in its normal position, second portion 120 of method 100 determines where it has probably been placed by determining which of the four other tires is no longer moving. This is accomplished by processor 16 executing some or all of steps 122–136. Steps 122, 126, 130, 134 may be executed in any order. For example, processor 16 examines the detected signal received from another of wheels 10, e.g., the wheel correlated in memory 28 with the left-front (LF) wheel location on the vehicle, by executing LF SENDER STOPPED? query 122. It does this, for example, by examining the 'motion' field code in the detected signal for that wheel. If the outcome of query 122 is YES (TRUE) indicating that that wheel is not moving, then in step 124, processor 16 swaps the SP and LF sender IDs in memory 28 so that the ID for the spare is now correlated with the LF wheel location, and the ID for the LF wheel is now correlated with the SP location. Following step 124, then as shown by path 125, method 100 returns to start 102 and initial query 104.

If the outcome of query 122 is NO, them method 100 performs the same test on another wheel location, e.g., RF SENDER STOPPED? query 126. If the outcome of query 126 is YES (TRUE) indicating that that wheel is not moving, then in step 128, processor 16 swaps the SP and RF sender IDs in memory 28 so that the ID for the spare is now correlated with the RF wheel location, and the ID for the RF wheel is now correlated with the SP location. Following step 128, then as shown by path 129, method 100 returns to start 102 and initial query 104.

If the outcome of query 126 is NO, them method 100 performs the same test on another wheel location, e.g., RR SENDER STOPPED? query 130. If the outcome of query 130 is YES (TRUE) indicating that that wheel is not moving, then in step 132, processor 16 swaps the SP and RR sender IDs in memory 28 so that the ID for the spare is now correlated with the RR wheel location, and the ID for the RR wheel is now correlated with the SP location. Following step 132, then as shown by path 133, method 100 returns to start 102 and initial query 104.

If the outcome of query 130 is NO, them method 100 performs the same test on another wheel location, e.g., LR SENDER STOPPED? query 134. If the outcome of query 134 is YES (TRUE) indicating that that wheel is not moving, then in step 136, processor 16 swaps the SP and LR sender IDs in memory 28 so that the ID for the spare is now correlated with the LR wheel location, and the ID for the LR wheel is now correlated with the SP location. If the outcome of query 134 is NO, them method 100 conveniently but not essentially proceeds to SET ALARM step 138 wherein for example, processor 16 causes display 22 to indicate that a malfunction condition has occurred, since an 'in motion' outcome from all wheels including the spare indicates a malfunction in a vehicle with only four rolling wheels. Nevertheless, step 138 is not essential and in place of or following step 138, method 100 returns to start 102 and initial query 104. Those of skill in the art will appreciate that method 100 can include providing on display 22 a wheel status indication after any of steps 124, 128, 132, 136, 138 or any other step where such indication would be useful to the driver.

While steps 120 are described in terms of swapping in memory 28 the SP ID with the ID of whichever of LR, RF, RR, LR wheel positions is not moving, this is merely one way of correcting the wheel ID-wheel location correlation information stored in memory 28 and is not intended to be limiting. Persons of skill in the art will understand based on the description herein that any way of correcting the wheel ID-wheel location correlation information may be used. What is important is that after method 100 is executed, the wheel IDs associated with the various wheel locations are correct, even though a new learn mode has not been executed. The present method does not depend upon re-executing a learn mode, but deduces the current wheel locations by executing method 100. The wheel ID versus wheel location information stored in memory 28 is updated to accurately reflect the current situation. Thus, as used herein, the words "SWAP SP & LF/RF/RR/LR SENDER ID LOCATIONS" are intended to encompass these alternative methods of correcting the wheel ID versus wheel location information stored in memory 28 or equivalent. It will also be noted that if no tire rotation-replacement has occurred, method 100 leaves the wheel ID versus wheel location information in memory 28 unchanged.

Figure 1:
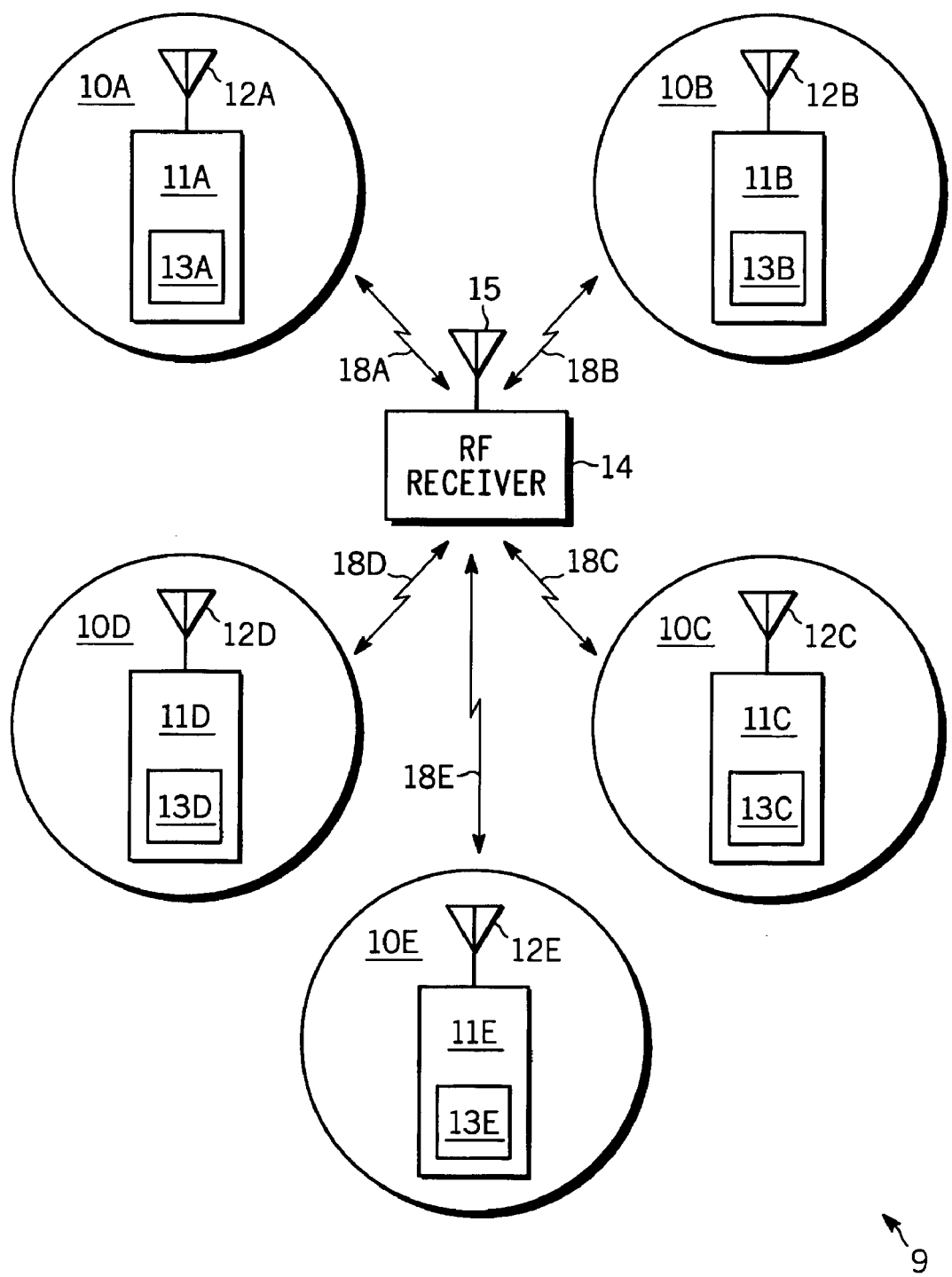
FIG. 1 is a simplified schematic diagram of a system comprising five vehicle wheels interacting with an on-board wheel data receiver, according to the prior art.

FIGS. 1–3 depict the situation for a vehicle with four rolling wheels and one spare, for a total of five wheels. However, persons of skill in the art will understand that the present invention applies to a vehicle with any number of rolling wheels more or less than four. Thus, in the general case, the present invention applies to vehicles with two or more rolling wheels. The present invention is useful even when there are multiple spares provided that both are not changed at the same time. For example, in a vehicle with multiple spares, if one spare is swapped for a previously rolling wheel, e.g., because of a flat on that previously rolling wheel location, then method 100 corrects the wheel ID versus wheel location data stored in memory 28 for that post-flat situation. If subsequently, a further rolling wheel goes flat (e.g., in the same or another rolling wheel location) and a second spare is mounted in place of the new flat, then method 100 once again unequivocally corrects the wheel ID versus wheel location data in memory 28. It does not matter how many spare wheels there are nor how many rolling wheels there are on the vehicle nor how many flats occur, method 100 will correct the wheel ID versus wheel location information without uncertainty as long as two or more previously rolling wheels are not replaced at the same time. This is a significant advantage, particularly with vehicles having larger numbers of rolling wheels and spares. When multiple spares are present, steps 118, 120 are repeated for each spare.

When two (or more) flats occur at the same time and, for example, two spares are mounted at the same time before the vehicle resumes normal operation, method 100 can still determine useful information: specifically, that both simultaneously mounted spares are rolling and that two of the previously rolling wheels are now in the spare positions, but cannot determine unequivocally which spare has gone into which of the two replaced rolling wheel positions. Thus, the spare wheel IDs can be in either of two replaced rolling wheel locations, but not elsewhere. This information while not completely precise is useful because it can alert the driver to the fact that two spares are now rolling in either of two wheel locations. The larger the number of wheels on the vehicle, the more useful this information.

When multiple spares are changed, steps 118, 120 are repeated for each spare. Where the multiple spares are mounted sequentially, then method 100 determines the spare locations exactly. Where two spares are mounted at the same time, then, on a first pass, method 100 will swap the ID of the first spare with the ID of the first location in steps 122, 126, 130, 134 leading to one of steps 124, 128, 132, 136, and on a second pass it will swap the ID of the second spare with the next location in steps 122, 126, 130, 134 leading to one of steps 124, 128, 132, 136. However, it cannot tell unequivocally which of the two newly mounted spares is in which of the two replaced rolling wheel position, but can tell that these spares are not on other rolling wheel positions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for determining a location of a spare wheel (SP) on a vehicle having a plurality of rolling wheels (RWs) and an SP stowage location, and wherein each of the plurality of RWs and the SP wheel comprises a unique wheel identification (ID) and a transmitter configured to send the unique wheel ID and a wheel motion status to the vehicle, wherein the method comprises the steps of:
   determining first whether the SP has been in motion for a predetermined time T;
   If NO (FALSE) then repeating the determining step; and
   IF YES (TRUE):
      determining second the unique wheel ID and the location on the vehicle of a previously rolling wheel (PRW) that is no longer in motion; and
      associating the SP ID with the PRW location and the PRW ID with the SP stowage location.

2. The method of claim 1 further comprising:
   stowing information gathered in the associating step in a memory associated with the vehicle.

3. The method of claim 1 wherein the determining first step comprises:
   receiving ID and wheel motion status from the SP sender;
   deciding first whether the SP wheel motion status indicates that the SP is in motion, and
      if the outcome of the deciding first step is NO (FALSE),
         deciding second whether or not the vehicle is in motion, and
            if the outcome of the deciding second step is NO (FALSE) repeating the receiving step, and
            if the outcome of the deciding second step is YES (TRUE) initializing an SP usage timer and then repeating the receiving step; and
      if the outcome of the deciding first step is YES (TRUE); then
         deciding third if the SP usage timer is active, and
            if the outcome of the deciding third step is NO (FALSE), then
               starting the SP usage timer; and
            if the outcome of the deciding third step is YES (TRUE); then
               deciding fourth if the SP usage timer has expired, and
                  if the outcome of the deciding fourth step is NO (FALSE) repeating the receiving step, and
                  if the outcome of the deciding fourth step is YES (TRUE), then
                     proceeding with the determining second step.

4. The method of claim 1 wherein the determining second and associating steps comprise:
   measuring whether the wheel motion status information for a previously rolling wheel indicates that the previously rolling wheel is now stopped, and
      if YES (TRUE), associating the SP ID with the former location of the previously rolling wheel and the previously rolling wheel ID with the SP stowage location, and
      if NO (FALSE), repeating the measuring and associating steps for other previously rolling wheels until a YES (TRUE) outcome is obtained or else no repetition yields a YES (TRUE) outcome.

5. The method of claim 4 wherein if the repeating step does not produce a YES (TRUE) outcome, then setting an error alarm.

6. An apparatus for determining whether a spare wheel (SP) has been moved from its stowage location to a rolling wheel (RW) location on a vehicle having multiple wheels, wherein each vehicle wheel includes a sender for transmitting a signal containing at least wheel identification (ID) and wheel motion status, comprising:
   a vehicle mounted receiver for receiving the signals broadcast by the senders;
   a processor coupled to the receiver for analyzing the received signals to determine each wheel ID and wheel motion status;
   a timer coupled to the processor for determining a predetermined time interval T;
   a memory coupled to the processor for storing information relating wheel ID to wheel location on the vehicle;
   wherein the processor analyzes the signals received from the wheels to determine whether the SP wheel has been rotating for a time T and if so, determines which remaining wheel is no longer rotating, then modifies the information stored in the memory so that the SP wheel ID becomes associated with the location previously occupied by the no longer rotating wheel and the ID of the no longer rotating wheel becomes associated with the SP storage location.

7. The apparatus of claim 6 further comprising a vehicle motion detector coupled to the processor for determining when the vehicle is in motion.

8. The apparatus of claim 7 wherein the motion detector is a speed sensor.

9. The apparatus of claim 6 further comprising a display coupled to the processor for presenting information on current tire location.

10. The apparatus of claim 6 wherein the timer is a software timer.

11. The apparatus of claim 6 wherein the timer is a hardware timer.

12. The apparatus of claim 6 wherein the timer is started when the signal received from the SP wheel sender indicates that the SP wheel is moving and the timer is stopped when predetermined time T has elapsed.

13. A method is provided for detecting when a spare wheel (SP) normally kept in a stowage location has replaced a normally rolling wheel on a vehicle, comprising:
   determining whether the SP is rolling; and if so
   starting an SP rolling timer and when the timer reaches predetermined time T; then
   examining motion status signal from remaining wheels to determine which wheel is now stopped, its ID and former location; and then
   associating a wheel ID for the SP with the former location of the stopped wheel and the stopped wheel ID with the stowage location of the SP.

14. The method of claim 13 further comprising after the associating step, storing the results in an on-board vehicle memory.

15. The method of claim 13 wherein the first determining step comprises:
   receiving a wheel ID and wheel motion status message from a sender on the spare wheel (SP);
   determining whether the motion status indicates that the SP is moving; and if so
   determining whether the vehicle is in motion.

16. The method of claim 15 wherein the starting step comprises:
   starting an SP usage timer when the SP motion status signal indicates that the SP is moving; and
   determining whether the SP usage timer has reached predetermined time T.

* * * * *